United States Patent
Zhou et al.

(10) Patent No.: US 9,720,121 B2
(45) Date of Patent: Aug. 1, 2017

(54) DEVICES AND METHODS FOR DOWNHOLE ACOUSTIC IMAGING

(71) Applicants: Quming Zhou, Houston, TX (US); James V. Leggett, III, Magnolia, TX (US)

(72) Inventors: Quming Zhou, Houston, TX (US); James V. Leggett, III, Magnolia, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 210 days.

(21) Appl. No.: 14/607,615

(22) Filed: Jan. 28, 2015

(65) Prior Publication Data

US 2016/0216393 A1    Jul. 28, 2016

(51) Int. Cl.
*G01V 1/44*      (2006.01)

(52) U.S. Cl.
CPC .......................... *G01V 1/44* (2013.01)

(58) Field of Classification Search
CPC ......................................... G01V 1/44
See application file for complete search history.

(56) References Cited

U.S. PATENT DOCUMENTS

| | | | |
|---|---|---|---|
| 3,406,776 A | 10/1968 | Henry | |
| 4,556,962 A | 12/1985 | Widrow | |
| 4,601,024 A * | 7/1986 | Broding | E21B 47/0002 367/86 |
| 4,692,908 A * | 9/1987 | Ekstrom | E21B 47/082 324/355 |
| 4,849,945 A | 7/1989 | Widrow | |
| 4,852,069 A | 7/1989 | Clerke et al. | |

(Continued)

FOREIGN PATENT DOCUMENTS

| | | |
|---|---|---|
| EP | 0457650 A2 | 11/1991 |
| GB | 2282664 A | 4/1995 |

(Continued)

OTHER PUBLICATIONS

Zhang, Imaging for Borehole Wall by a Cylindrical Linear Phased Array, Chin. Phys. Lett. vol. 27, No. 9 (2010) 094301, pp. 1-4.*

(Continued)

*Primary Examiner* — Hovhannes Baghdasaryan
(74) *Attorney, Agent, or Firm* — Cantor Colburn LLP

(57) ABSTRACT

A method of performing acoustic imaging includes: selecting a target location, and selecting a group of transducers from a plurality of transducers to transmit an acoustic beam to be electronically directed to the target location; selecting a transmitter having an orientation toward a location proximate to the target location, and transmitting an acoustic signal only by the transmitter; detecting an acoustic return signal by the transmitter and by a plurality of other transducers in the group; estimating a travel time for each of the group of transducers, the estimating including measuring a travel time for each of the other transducers, and estimating a travel time for the transmitter based on the travel time for each of the other transducers; and calculating beamforming delays based on the travel time, the beamforming delay configured to cause the group of transducers to direct an acoustic beam to the target location.

20 Claims, 7 Drawing Sheets

(56) References Cited

U.S. PATENT DOCUMENTS

| | | | |
|---|---|---|---|
| 4,867,264 A * | 9/1989 | Siegfried | E21B 47/0002 |
| | | | 181/105 |
| 5,555,530 A | 9/1996 | Meehan | |
| 5,581,620 A | 12/1996 | Brandstein | |
| 5,638,337 A | 6/1997 | Priest | |
| 5,776,066 A | 7/1998 | Nock | |
| 5,971,095 A | 10/1999 | Ozbek | |
| 6,651,007 B2 | 11/2003 | Ozbek | |
| 6,719,695 B2 | 4/2004 | Bae et al. | |
| 6,956,790 B2 | 10/2005 | Haldorsen | |
| 7,128,712 B2 | 10/2006 | Rigby | |
| 7,513,147 B2 | 4/2009 | Yogeswaren | |
| 8,117,907 B2 * | 2/2012 | Han | E21B 47/082 |
| | | | 73/152.58 |
| 8,416,643 B2 | 4/2013 | Magee | |
| 8,469,893 B2 | 6/2013 | Chiang | |
| 2005/0259512 A1 | 11/2005 | Mandal | |
| 2007/0070809 A1 * | 3/2007 | Hurst | G01V 1/46 |
| | | | 367/25 |
| 2007/0070810 A1 * | 3/2007 | Hurst | G01V 1/46 |
| | | | 367/35 |
| 2008/0204322 A1 * | 8/2008 | Oswald | G01S 5/04 |
| | | | 342/465 |
| 2009/0105592 A1 * | 4/2009 | Yao | A61B 8/0883 |
| | | | 600/447 |
| 2009/0205899 A1 | 8/2009 | Geerits et al. | |
| 2010/0265795 A1 * | 10/2010 | Johnson | G01V 1/44 |
| | | | 367/32 |
| 2011/0069581 A1 | 3/2011 | Krohn | |
| 2012/0127830 A1 | 5/2012 | Desai | |
| 2012/0157851 A1 | 6/2012 | Zwirn | |
| 2012/0287749 A1 | 11/2012 | Kutlik et al. | |
| 2014/0177388 A1 | 6/2014 | D'Angelo | |

FOREIGN PATENT DOCUMENTS

| | | |
|---|---|---|
| WO | 9852033 A1 | 11/1998 |
| WO | 2009152337 A2 | 12/2009 |
| WO | 2012015421 A1 | 2/2012 |

OTHER PUBLICATIONS

Hussain, Cylindrical Array Beamforming Based on Ultra-Wideband Signals, Radar Conference, 2005 IEEE International, May 2005.*

2005 Art by Fang-Qing, Radiation Acoustic Field of a Linear Phase array on Cylindrical Surface, Chin Phys Lett, vol. 23, No. 12, 2006 pp. 3297-3300.*

Ji, et al.; "Noise Attenuation Methods for Point-receiver Land Seismic Data"; 2010 SEG Annual Meeting, Oct. 17-22, 2010, Denver, Colorado, USA; 5 pages.

Notification of Transmittal of the International Search Report and the Written Opinion of the International Searching Authority, or the Declaration; PCT/US2016/0150987; Mail Date: Apr. 25, 2016; 10 pages.

Radtke, et al.; "Low-Frequency Drill Bit Seismic While Drilling", 2009 Offshore Tech Conference, Houston, Texas, USA; May 4-7, 2009; 10 pages.

Romer, Michael, "Beamforming Adaptive Arrays with Graphics Processing Units", Repositories, 2008, pp. 1-12, located at http://hdl.handle.net/2152/13375.

* cited by examiner

DEVICES AND METHODS FOR DOWNHOLE ACOUSTIC IMAGING

BACKGROUND

Acoustic imaging includes a variety of techniques that are used in the energy industry to measure or estimate characteristics of earth formations. For example, ultrasonic imaging tools can be deployed in a borehole and used to obtain information regarding formation characteristics such as lithology and fracture configurations. Such tools can also be used to determine casing conditions. Downhole conditions require that imaging tool components be able to operate effectively in high temperature conditions. The ability to effectively direct an acoustic beam to a desired location of a formation can be effected by the harshness of a downhole environment and changing conditions downhole.

SUMMARY

An embodiment of a method of performing acoustic imaging includes: disposing a carrier in a borehole in an earth formation, the carrier including an acoustic imaging device, the acoustic imaging device including a plurality of acoustic transducers, each transducer having an associated orientation; selecting a target location, and selecting a group of transducers from the plurality to transmit an acoustic beam to be electronically directed to the target location; selecting at least one transducer as a transmitter, the transmitter having an orientation toward a location proximate to the target location, and transmitting an acoustic signal only by the transmitter; detecting an acoustic return signal by the transmitter and by a plurality of other transducers in the group; estimating a travel time for each of the group of transducers, the travel time corresponding to the amount of time between transmitting the acoustic signal to the location and detecting the acoustic return signal, the estimating including measuring a travel time for each of the other transducers, and estimating a travel time for the transmitter based on the travel time for each of the other transducers; and calculating a beamforming delay associated with the transmitter and the other transducers based on the travel time, the beamforming delay configured to cause the group of transducers to generate an acoustic beam that is directed to the target location.

An embodiment of an apparatus for performing acoustic imaging includes: a carrier configured to be disposed in a borehole in an earth formation, the carrier including an acoustic imaging device, the acoustic imaging device including a plurality of acoustic transducers, each transducer having an associated orientation; a processor; and a delay circuit configured to apply a beamforming delay to a control signal sent by the processor to each of a group of transducers. The processor is configured to perform: selecting a target location, and selecting a group of transducers from the plurality to transmit an acoustic beam to be electronically directed to the target location; selecting at least one transducer as a transmitter, the transmitter having an orientation toward a location proximate to the target location; sending a control signal to the transmitter, the control signal causing only the transmitter to transmit acoustic signal; receiving an acoustic return signal detected by the transmitter and by a plurality of other transducers in the group; estimating a travel time for each of the group of transducers, the travel time corresponding to the amount of time between transmitting the acoustic signal to the location and detecting the acoustic return signal, the estimating including measuring a travel time for each of the other transducers, and estimating a travel time for the transmitter based on the travel time for each of the other transducers; and calculating a beamforming delay associated with the transmitter and the other transducers based on the travel time, the beamforming delay configured to cause the group of transducers to generate an acoustic beam that is directed to the target location; and

BRIEF DESCRIPTION OF THE DRAWINGS

The following descriptions should not be considered limiting in any way. With reference to the accompanying drawings, like elements are numbered alike.

DETAILED DESCRIPTION

Embodiments described herein provide systems, devices and methods for acoustic imaging of a borehole and/or an earth formation. High resolution acoustic images can be achieved, such as images of borehole fractures. In some embodiments, imaging is performed using an acoustic transducer that includes an array of individual transducer elements, such as piezoelectric bars or other elements. By selecting different delays for elements in a selected group, an acoustic beam can be focused to a selected axial and radial location around the transducer.

An adaptive beamforming process is used to control an acoustic transducer array to direct and/or focus an acoustic beam to selected target locations. The beamforming process is based on the invariance of the wave equation under a time-reversal operation, which means that the time-reversed wave field back-propagates through an inhomogeneous medium, and optimally refocuses on the source. The delays used to excite the transmitter array elements to focus the acoustic energy are calculated from the reflection waveforms. Through adaptive beamforming, an imaging device including an acoustic phased array transducer can deliver an improved resolution that is not limited to the number of transducers in the tool as well.

In one embodiment, the transducer array includes a circular or semicircular array of piezoelectric or other types of elements that are configured to transmit and receive acoustic signals. The transducer array may be utilized in an imaging operation using a non-rotating (e.g., wireline) tool or a rotating (e.g., logging while drilling) tool. An acoustic beam is steered or directed using beamforming to scan over an angular distance (360 degree or less) as the tool advances through a borehole or held at a selected depth. Adaptive beamforming methods described herein may be used before or during the operation to calculate the delays required for a group of transducers to direct an acoustic beam to a selected target location. In this way, the transducer array can be used to further image a feature of interest and/or periodically or continuously update delays during the operation.

Figure 1:
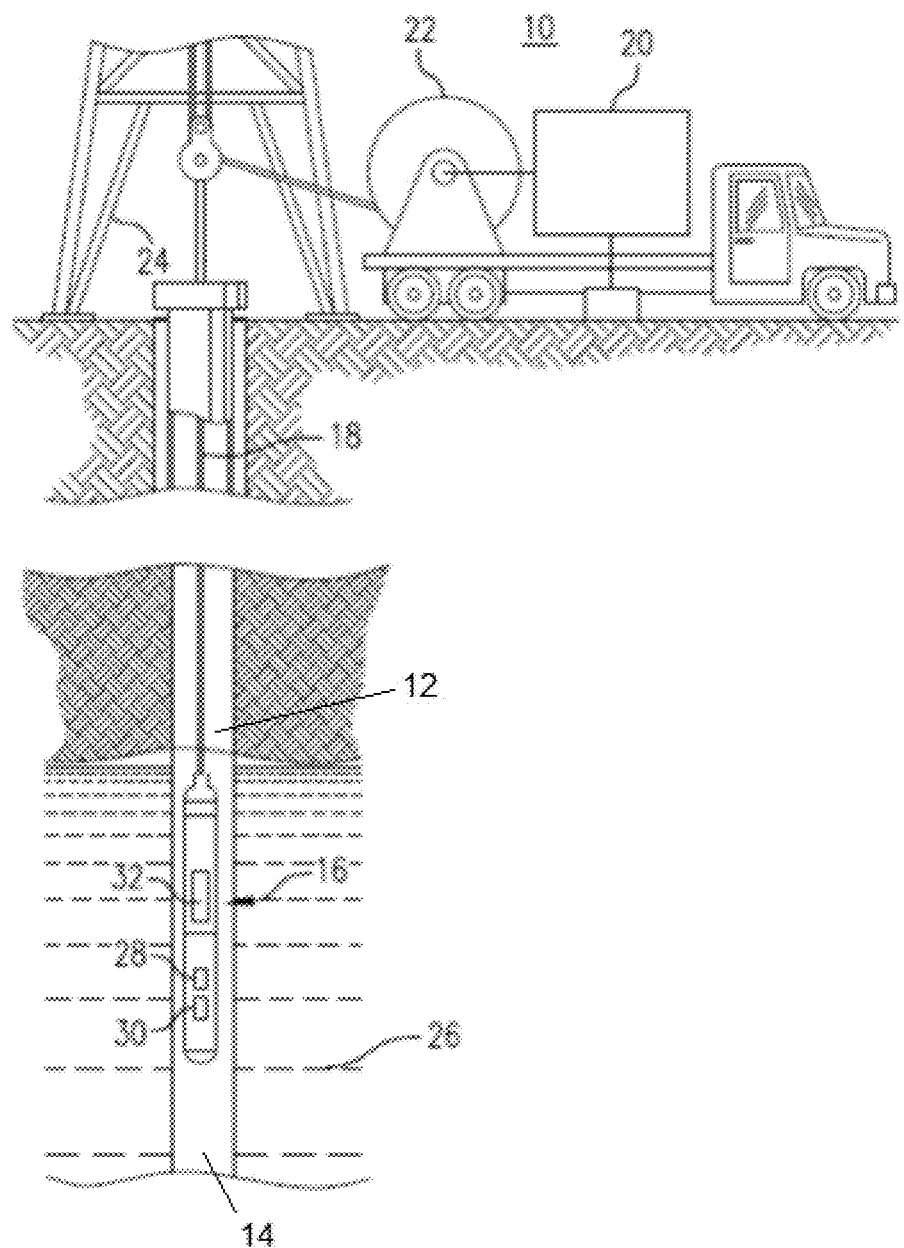
FIG. 1 depicts an embodiment of a system for evaluating or measuring a formation.

FIG. 1 illustrates aspects of an exemplary embodiment of a system 10 for performing energy industry operations such as formation measurement and/or evaluation, hydrocarbon production, completion and stimulation. The system 10 includes a borehole string 12 such as a pipe string, coiled tubing, wireline or other carrier disposed within a borehole 14 that is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In the embodiment shown in FIG. 1, the system 10 is configured as a well logging system that includes a logging assembly or tool 16 that is disposed in the borehole 14 via a wireline 18. A surface deployment system includes a surface control unit 20 for controlling a winch 22 or other deployment device that lowers the wireline 18 from a rig 24, platform, wellhead and/or other surface structure. The system 10 may include various other components for facilitating a measurement operation, and/or for facilitating other energy operations. For example, the system 10 may include a pumping device in fluid communication with a fluid tank or other fluid source for circulating fluid through the borehole 14. The system 10 may also include a drilling assembly. Measurement operations can thus be performed in conjunction with various energy industry operations, such as drilling operations, stimulation operations (e.g., hydraulic fracturing and steam lift), completion operations and production operations.

The tool 16 may be configured as a data acquisition tool that is a part of a measurement and/or monitoring system. The data acquisition tool 16 is disposed in the borehole 14 and advanced to an area or location of interest within a formation 26. The data acquisition tool 16 is configured to emit measurement signals into the formation 26 to estimate characteristics thereof. The borehole 14 may be a vertical borehole as shown in FIG. 1, but is not so limited. The borehole or portions thereof can be vertical, deviated, horizontal and can have any selected path through a formation.

In one embodiment, the tool 16 and/or the system 10 is configured for acoustic imaging of the formation 26 and/or other area of interest. The tool 16 includes one or more acoustic monopole and/or multipole transmitters 28 that emit ultrasonic and/or other acoustic energy pulses (also referred to as "measurement signals" or "acoustic signals"). One or more acoustic receivers 30 are disposed at the tool 16 for receiving echo signals from the formation 26. In one embodiment, the receiver 30 and the transmitter 28 are incorporated as an acoustic transducer assembly having a transducer array that includes a plurality of transducer elements capable of both transmitting and receiving or detecting acoustic signals. The tool 16 is employed to generate an image of a borehole wall and/or formation. For example, features of the formation can be evaluated by imaging formation fractures. In addition, borehole casing can be evaluated by imaging the casing after it is in the borehole and before and/or after cementing.

Images generated using the tool 16 and/or transducer assembly can be analyzed to evaluate formation characteristics, such as identifying and characterizing natural and/or stimulated fractures (e.g., estimating strike, dip and apparent aperture). Thus information is useful in evaluating formations, performing fracturing operations and monitoring or evaluating other subterranean operations such as geothermal energy production.

The data acquisition tool 16 is configured to monitor and/or collect data related to formation characteristics. The tool 16 may be deployed downhole via any suitable carrier and may be configured to operate in conjunction with other downhole or surface tools. In one embodiment, the tool 16 and/or other downhole components are in communication with one or more processing units or devices, such as a downhole electronics unit 32 and/or a surface processor such as the control unit 20. The processing devices are configured to perform various functions including receiving, storing, transmitting and/or processing data from the tool 16. The processing devices include any number of suitable components, such as processors, memory, communication devices and power sources. Communication can be achieved via any suitable configuration, such as acoustic, electrical or optical communication, wireless communication and mud pulse telemetry.

Figure 2:
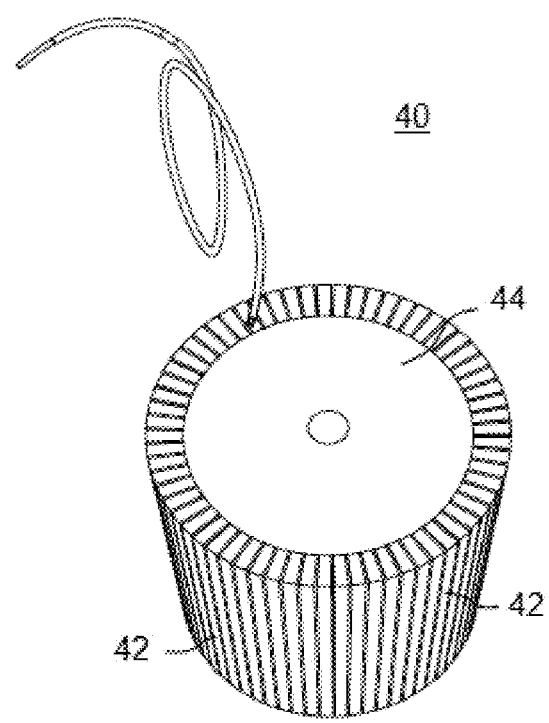
FIG. 2 depicts an embodiment of an acoustic transducer assembly including a transducer element array.

FIG. 2 illustrates an exemplary acoustic transducer assembly 40 that includes a plurality of piezoelectric or other type of actuating elements 42 that are arranged in a circular or semi-circular array. The transducer assembly may be configured to be disposed in or with a measurement tool such as the tool 16.

The transducer elements or actuating elements 42 are arranged as a circular or semicircular array. Each element 42 or group of elements is individually controllable and can be pulsed separately, resulting in a phased array. The timing of pulsing for each element 42 (or group of elements) can be varied to electronically steer an ultrasonic or acoustic beam. For example, pulsing the elements 42 successively along an array produces a pattern of constructive interference that results in a beam having a selected angle. Thus, the beam can be swept without requiring physical movement of the array in the direction of the sweep. Thus, these embodiments do not require rotation of a transducer.

Although the array is described as including a plurality of individual elements, it is not so limited. Instead of assembling individual elements into an array, a single element can be segmented to create individual actuating elements. For example, a disc or cylinder of piezoelectric material can be cut, grooved, diced or otherwise segmented to create the array from one or more of the chosen shapes. In addition, the actuating elements 42 can be segmented to create multiple actuating elements that can be individually actuated to allow for axial beam steering.

In one embodiment, the array is included in a support structure that includes a backing material 44 in contact with the elements. The backing material 44 has a high acoustic impedance relative to other components or materials in the intended acoustic beam path, such as a lens, filling material, a window and borehole fluids. In the embodiment of FIG. 2, the backing material 44 is disposed against the inside surface of the actuator element array, which is opposite the outside surface from which acoustic signals are to be emitted for measurement.

In one embodiment, the actuating elements 42 in the array are bars or other elongated structures which are elongated in an axial direction, e.g., along an axis of a downhole tool. The bars form a circular or semi-circular shape in a plane perpendicular to the axial direction. For example, the actuating elements 42 are oriented so that each element's longitudinal axis is at least substantially parallel to the longitudinal axis of the tool 16 and/or transducer assembly 40, although other orientations may be utilized. In the embodiments described herein, the array is an array of 64 to 128 piezoelectric elements, however the number of elements is not so limited.

The transducer and transducer assemblies are not limited to the specific configurations described herein, as the transducer can be shaped and positioned in any manner to allow for transmission of acoustic signals. For example, the transducer can be mounted on an extendable arm or member to extend the transducer into the borehole annulus and/or contact the borehole wall. The extendable member may include a transducer to perform acoustic measurements from various locations in the annulus (e.g., at one or more different radial distances from the tool or borehole string) and/or in direct contact with the borehole wall. In one embodiment, the tool may include an extendable arm, radially protruding member and/or other mechanism that includes an acoustic transducer in contact with the borehole wall, and one or more additional transducers positioned at desired locations in the annulus. Such mechanism allows for, e.g., precise positioning of the transducer and/or caliper-like measurements. For example, measurements of the time of flight in the formation and/or borehole can be accurately measured.

Performing acoustic measurements in a high temperature borehole environment presents unique challenges due to conditions such as high temperatures and pressures, borehole and formation fluids, and limited space available in the borehole. Such an environment is very different than that typically found in Non-Destructive testing and in Medical Imaging, and thus requires different engineering and performance considerations.

Figure 3:
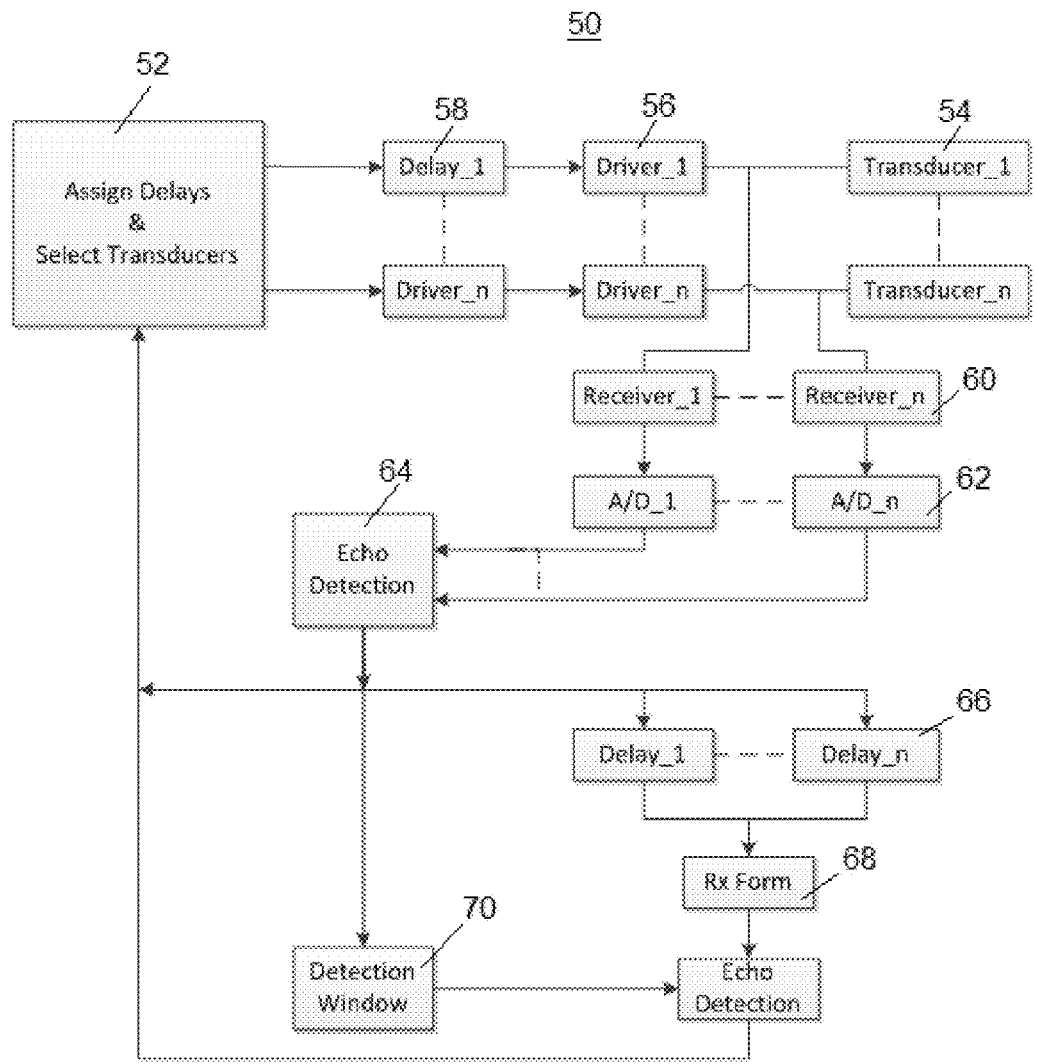
FIG. 3 depicts an embodiment of an acoustic imaging assembly.
Figure 4:
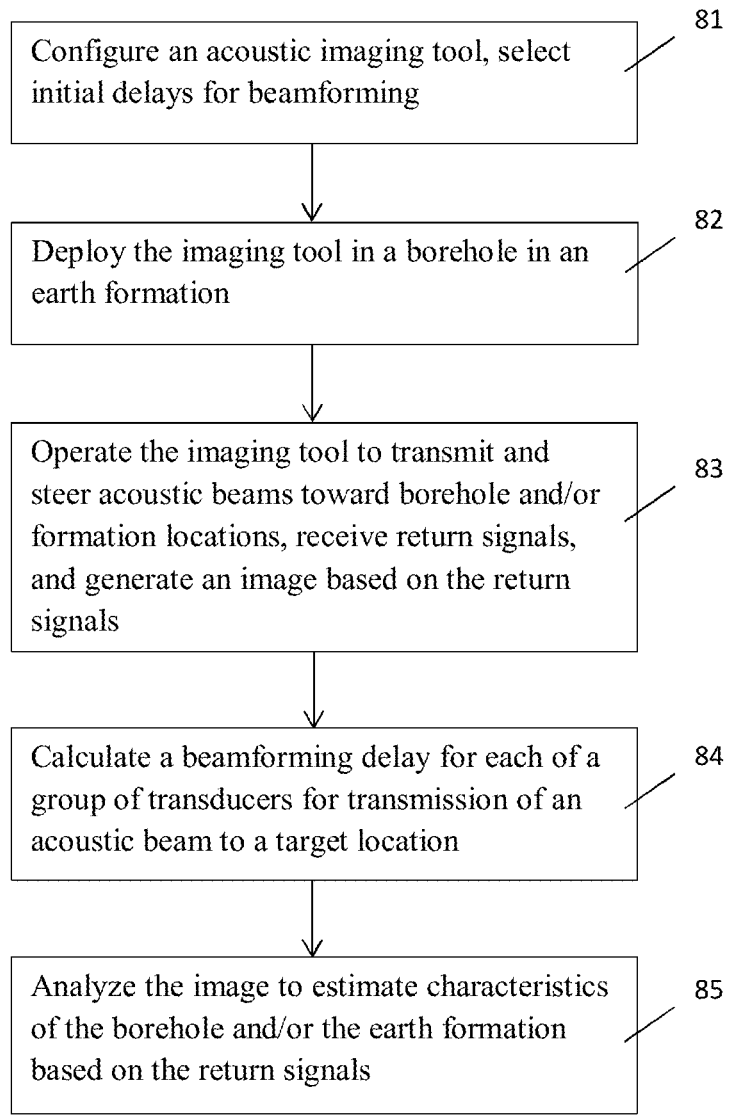
FIG. 4 is a flow chart depicting an embodiment of a method of acoustically imaging a borehole and/or a formation.

FIG. 3 shows an embodiment of an acoustic imaging assembly 50 configured to actuate the transducer assembly and direct acoustic beams by selectively actuating individual transducer elements. The imaging system is adaptive to borehole conditions, and can be used in a rotating configuration (e.g., logging while drilling) or a non-rotating configuration (e.g., wireline tools).

The imaging assembly 50 includes a controller 52 configured to control operation of a plurality of transducer elements 54, shown as Transducer_1 through Transducer_n, where "n" is the number of elements 54. The transducer elements 54 (also referred to simply as transducers or elements) are, for example, piezoelectric bars such as those shown in FIG. 2. It is noted that the number, shape, size and configuration of the elements 54 is not limited to the embodiments described herein.

The controller 52 performs various functions, such as selecting transducer groups based on desired beam directions and focusing locations, actuating transducer elements 54, selecting delay patterns and receiving acoustic detection data. The controller 52 may be configured as any suitable processing device or component, such as a processor, microprocessor, software component, etc.

The controller 52 is coupled to a plurality of drivers 56 (shown as Driver_1 through Driver_n), each associated with a respective transducer 54. Each driver includes circuitry that processes control signals from the controller 52 and outputs an electrical signal to the respective transducer to cause the transducer to output an acoustic signal. In order to control the delay for each transducer, delay circuitry 58 introduces a suitable delay to each transducer based on instructions from the controller 52 (i.e., transmit beamforming). Delays for each transducer are selected according to an algorithm corresponding to methods described herein.

The imaging assembly 50 also includes receiver circuitry 60 (shown as Receiver_1 through Receiver_n) and associated analog to digital converters 62 that are configured to receive signals from respective transducers, convert the signals to a digital signal that includes the waveform of the acoustic signals received by the transducers. The digital signals are output to a detection module 64, which adjusts the corresponding waveforms via delay circuitry 66 to generate adjusted waveforms 68. Waveforms detected by the detection module 64, as well as the adjusted waveforms 68 (which may be selected according to a detection window 70) can be transmitted to the controller 52.

The imaging assembly 50 is configured, in one embodiment, to perform both beamforming and adaptive beamforming to control transducer array focusing for target spots. Beamforming involves directing and/or focusing an acoustic beam by exciting multiple transducer elements in a selected group according to different delays. By controlling the relative amplitude and phase (delay) of each transducer, a pattern of constructive and destructive interference between acoustic waves generated by the transducers causes the signal energy to be directed toward a selected location. Such a location may be an angular location in a plane perpendicular to the transducer assembly, tool and/or borehole axis.

Adaptive beamforming involves selecting an optimum or preferred transducer element array group and appropriate delays to focus an acoustic beam onto a target surface. It is based on the invariance of the wave equation under a time-reversal operation, which means that the time-reversed wave field back-propagates through the inhomogeneous medium, and optimally refocuses on the source. The delays used to excite the transmitter array elements to focus the acoustic energy are calculated from the reflection waveforms. By employing adaptive beamforming techniques, the appropriate group and/or delay pattern for a particular target can be adjusted so that a location of interest can be accurately targeted despite changes in the borehole environment.

The architecture illustrated in FIG. 3 provides a high level of flexibility in transducer selection. Using this architecture, accurate delays used for beamforming can be calculated from reflection waveforms in real time, allowing for calibration or updating of delays during a logging or other operation, as well as providing flexibility in directing acoustic beams toward locations of interest and/or increasing resolution of images of selected locations or areas of interest.

FIGS. 4-10 illustrate aspects of exemplary embodiments of methods for actuating acoustic transducers and emitting acoustic signals (e.g., ultrasonic signals) for acoustic measurement or imaging. The methods employ adaptive beamforming to control transducer array focusing for target locations and image scanning.

An embodiment of a method 80 of actuating acoustic transducers, configuring transducers, and imaging a borehole and/or formation includes one or more of the following stages 81-85. The method 80 is described herein in conjunction with a processor (e.g., the processing unit 20) in communication with an acoustic transducer assembly. The method 80 may be performed in conjunction with, for example, the system 10, the transducer assembly 40 and/or the imaging assembly 50, but is not so limited, and can be performed in conjunction with any number of processing devices and acoustic imaging tools. In one embodiment, the stages 81-85 are performed in the order described, although some steps may be performed in a different order or one or more steps may be omitted.

In the first stage 81, an acoustic imaging tool is prepared for use in imaging a borehole and/or earth formation. In one embodiment, the tool is initially configured by programming the tool's control processor (e.g., a surface processing unit or a downhole control unit such as the controller 52). Based on considerations such as borehole geometry, the number, type and configuration of transducer elements, anticipated borehole fluids and expected lithology, the delays required for beamforming are selected. The delays may be selected initially at the surface, or may be defined downhole after deployment.

In the second stage 82, an imaging tool such as the tool 16 and/or system 50 is disposed in a borehole in an earth formation. The imaging tool may be deployed, for example, as a wireline tool or logging while drilling (LWD) tool.

The imaging tool includes a phased array of piezoelectric or other types of transducer elements (e.g., fluid pressure generating and sensing components). In one embodiment, the imaging tool includes an array of fixed elements instead of rotating a small number of transducers to achieve a high resolution image. For example, the imaging tool includes an annular array of piezoelectric transducers configured to transmit acoustic pulses and receive reflected echoes. The array may be circular or semicircular. The imaging tool may have any suitable number of elements. In the example described herein, the tool includes 64 transducers that can be used to achieve multiples of 64 pixels (e.g., 2×64, 3×64, . . . ) per one borehole revolution.

In the third stage 83, the imaging tool is operated to emit acoustic signals into the borehole and receive reflected acoustic signals, which are analyzed to estimate properties of the borehole and/or formation. For example, the tool is operated to generate images of the borehole wall and identify fractures in the formation.

During this stage, beamforming is employed to steer and focus acoustic energy to different locations. This acoustic energy or beam may be steered according to a predetermined pattern, for example steered so that the beam is electronically rotated to image the borehole wall over a 360 degree range or a subset thereof.

For example, an axis is selected for initially directing the beam, e.g., a radial axis perpendicular from the tool axis. When the initial axis is selected, rotation is simulated by beam steering. For example, delay pulsing is used by pulsing a first group of elements in the array, and then pulsing a second adjacent group in the direction of steering. This delayed pulsing in conjunction with focusing features described herein provides for a radially focused beam that is rotated while maintaining an axial level relative to the tool.

In one example, for each group of elements, the beam is focused by selecting the outermost pairs in the group, actuating the outermost pairs for a selected time, and subsequently selected adjacent inner pairs and actuating the inner pairs for a shorter time. This is repeated for successive pairs until the innermost pair is actuated at the center of the group. The innermost pair is actuated for the shortest time period.

The tool is advanced through a borehole as the beam is electronically steered. Each rotation of the beam produces an image line, which are combined to produce an acoustic image.

Beamforming may include both "transmit beamforming" and "receive beamforming." Transmit beamforming involves exciting a plurality of transducers with respective time delays. More than one transducer element is excited with delays to focus acoustic energy to different borehole wall locations. The echo reflected from the borehole wall is enhanced using receive beamforming, which includes using multiple transducer elements as receivers and summing the echo waveforms received. These echo waveforms are adjusted by an appropriate delay as in the transmission to compensate for different distances from the individual receivers to the borehole wall.

Due to the harshness of downhole environments, many factors make both transmit and receive beamforming difficult to achieve, including the change in acoustic velocity of drilling mud or other fluids, decentralization of the tool, changes in borehole size, and individual element performance variations, including failure of any transducer elements. Adaptive beamforming can select the best transducer element array group and appropriate delays to focus acoustic beams onto a target surface, and adjust the delays in response to changing conditions (e.g., changes in fluid makeup, eccentricity of the tool, changes in borehole diameter, and changes in the surface of the borehole wall).

In the fourth stage 84, the tool calculates delays for a group of transducers for one or more target locations or focal points. This adaptive beamforming calculation can be performed automatically and in real time during the operation for multiple locations, so that changes in downhole conditions are accounted for and delays are adjusted so that a high quality image is maintained. In other embodiments, the calculation is performed in response to the processor or user to focus the beam to a location of interest, such as a feature detected during the operation (e.g., a fault, change in diameter, or change in rugosity of the borehole wall or casing features).

The calculation includes selecting a group of transducers associated with a target location. This group will typically include a pair of transducers that are oriented toward locations that are closest to the target location, and a number of transducers adjacent to or near the pair of transducers.

Appropriate delays for each transducer in the group are calculated based on a waveform reflected from the borehole and/or formation in response to actuation of one or more elements. The reflected waveform is detected by both the transmitting element and the other elements in the selected group, and the arrival times of the reflected waveform measured by all of the elements are used to calculate the appropriate delays.

The calculation is based on a combination of pulse echo detection and "pitch-catch" techniques. The pulse echo detection involves transmitting an acoustic signal from a transducer element, and receiving a reflected waveform from the same transducer element. Pitch-catch techniques involve transmitting the acoustic signal from the transmitting element and receiving a reflected waveform at each of the other elements in the group.

In the fifth stage 85, the acoustic images generated by the tool and methods described herein are analyzed to estimate characteristics of a borehole, casing and/or formation. For example, the acoustic image is analyzed to identify fractures and estimate fracture characteristics.

Calculation of the delays is described in conjunction with an example illustrated in FIGS. 5-9. In this example, an imaging tool including a circular transducer assembly, such as the transducer assembly 40, is disposed in a borehole 90. The section of the borehole to be imaged may be an open hole (e.g., for imaging fractures) or a cased hole (e.g., for evaluating casing condition).

In this example, the transducer assembly includes 64 individual transducer elements arrayed around the circumference of the transducer assembly. Each transducer is oriented such that an acoustic signal generated by an individual transducer propagates in a radial direction along a radial axis (r) extending from a central axis (z) of the assembly through the transducer.

In order to steer an acoustic beam, a group of adjacent transducers is selected that includes one or more transducer elements that are oriented near a target location on (or in the near field behind) the borehole wall 92. In this example, the group is shown as adjacent elements e1, e2, e3 and e4, which are oriented toward locations b1, b2, b3 and b4, respectively. The target location in this example is between locations b2 and b3, thus this group was selected to include an inner pair (e2 and e3) oriented toward locations closest to the target, and an outer pair (e1 and e4). Additional pairs located further away from the inner pair may also be selected if desired.

Figure 5:
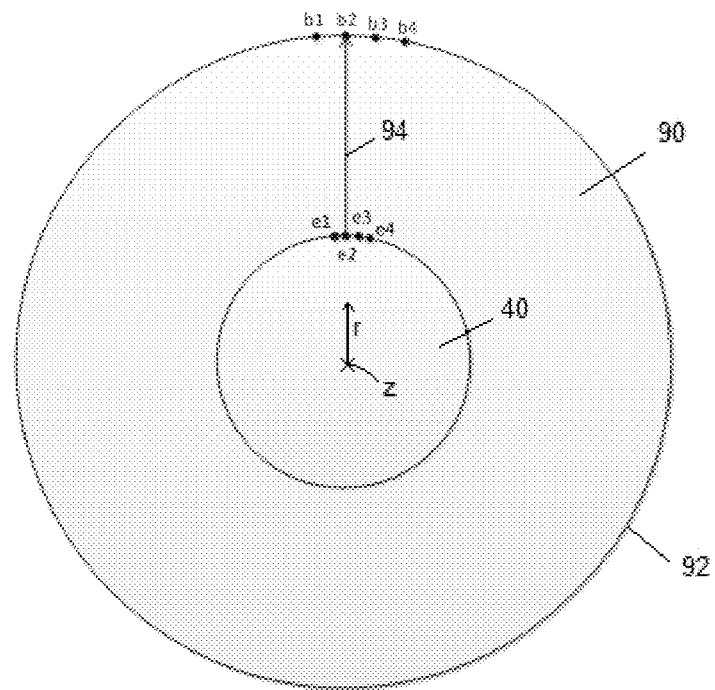
FIG. 5 depicts an aspect of an exemplary method of calculating beamforming delays for a group of transducers.
Figure 6:
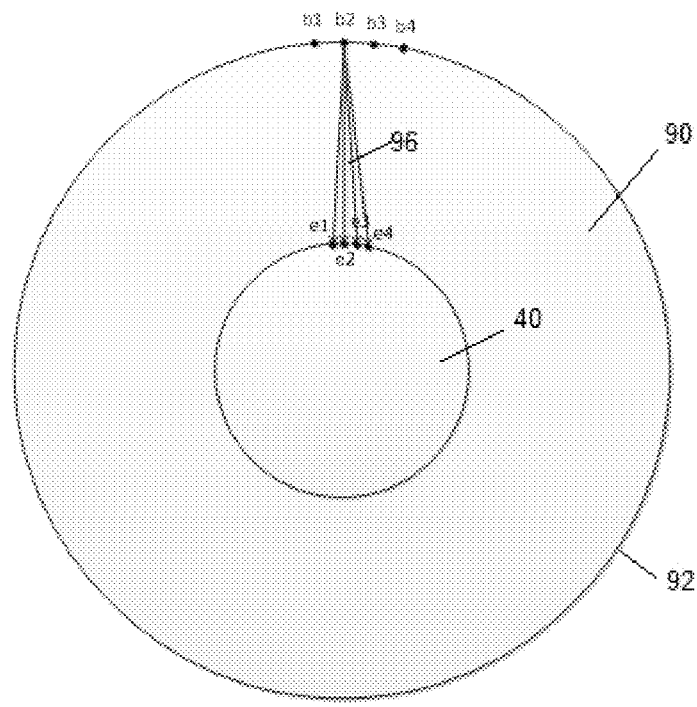
FIG. 6 depicts another aspect of the method of FIG. 5.

Referring to FIG. 5, element e2 is set to transmit and all of the elements in the group are configured to receive acoustic signals. Element e2 is actuated to emit an acoustic pulse 94. As shown in FIG. 6, the acoustic pulse is partially reflected from the borehole wall (and/or near field region near the borehole wall) as an acoustic echo 96. The echo 96 is measured by elements e1, e2, e3, and e4. For each element, the received echo is converted to a discrete waveform, which is recorded in a memory. Since e1, e3, and e4 are not used as transmitters, they have less transducer ringing effects than e2.

The travel time for each element is measured using, e.g., clock circuitry, by recording the time of the emitted pulse and the time that an echo was received by each element. First, the travel times at e1, e3 and e4 are measured. The travel time at e2 is then measured based on the values of e1 and e3. As the elements e1 and e3 have reduced ringing effects, the echoes for these elements can be more easily detected than the echo for e2. The travel times to the location b2 and back for each element are referred to as "travel time delays." The four travel time delays are noted as delay_e1_b2, delay_e2_b2, delay_e3_b2, and delay_e4_b2.

The travel time for e2 can be obtained via several approaches, such as detecting the echo and detection time at e2, using the average value of the travel time for two adjacent elements, e1 and e3, using the travel time of e2 projected from previous resolutions, and/or using a look up table based on the borehole geometry. In one embodiment, the travel time for e2 is calculated using a voting method, where the travel time that can be verified by at least two approaches is selected as the right value. This voting method is to prevent false detection, thereby improving the accuracy.

For example, delay_e1_b2, delay_e3_b2 and delay_e4_b2 are directly measured from their echoes respectively, as the measuring is less susceptive to ring down noise since e1, e3, and e4 are not the transmitters in this process. Delay_e2_b2 is calculated using the voting method (or other suitable method using measured travel times) since the ring down noise at the transmitter e2 may overlap with the echo at e2.

Figure 7:
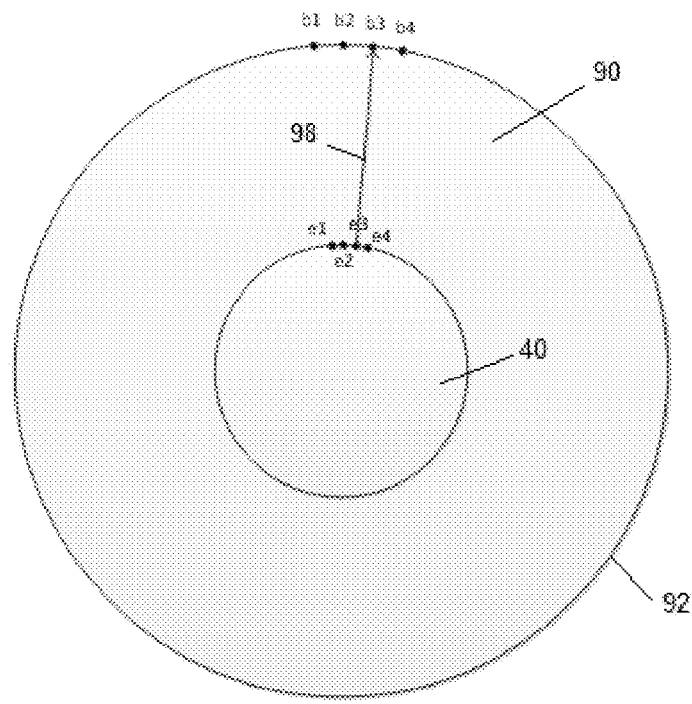
FIG. 7 depicts yet another aspect of the method of FIG. 5.
Figure 8:
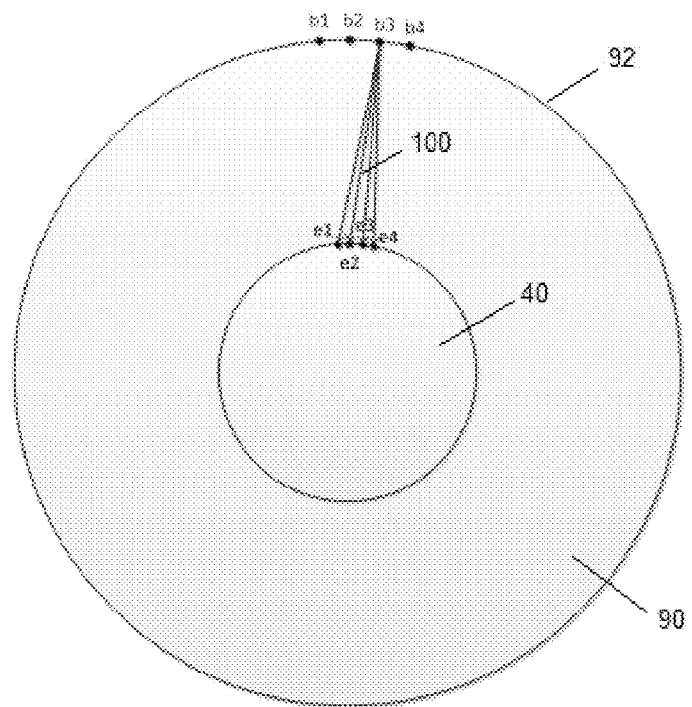
FIG. 8 depicts a further aspect of the method of FIG. 5.

Referring to FIGS. 7 and 8, the same procedure is performed for e3, the second element of the inner pair. Element e3 is set to transmit, and all of the elements are set to receive. An acoustic pulse 98 is emitted and an echo 100 is measured by each element. Travel times to the location b3 are measured for e1, e2 and e4, and the travel time for e3 is calculated based on the travel times for e2 and e4

Calculation of the travel time for b3 is similar to that for b2 discussed above. For example, the travel time for e3 can be obtained by detecting the echo at e3, using the average value of two adjacent elements, e2 and e4, using the travel time of e3 projected from previous resolutions, and/or using a look up table based on the borehole geometry. In one embodiment, the travel time is calculated based on a voting method, where the travel time that can be verified by at least two approaches is selected as the right value. The four travel time delays are referred to as delay_e1_b3, delay_e2_b3, delay_e3_b3, and delay_e4_b3.

Figure 9:
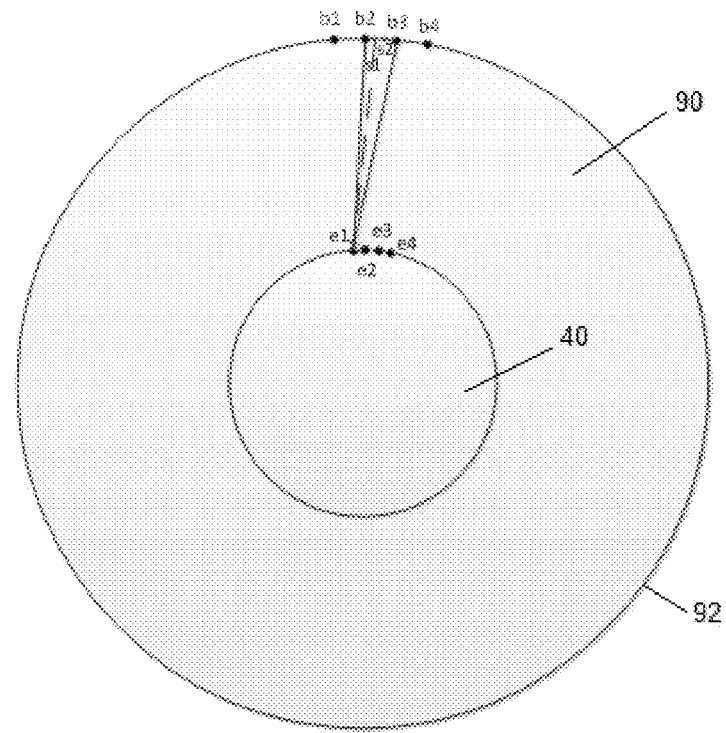
FIG. 9 depicts a still further aspect of the method of FIG. 5.

Referring to FIG. 9, the delay for each element required to direct the beam to a target location (referred to as the "beam delay") is calculated. In this example, two target locations between b2 and b3 are selected, referred to as s1 and s2.

First, the delay associated with the travel time between each target location and each element is calculated. For element e1, the travel time delay associated with s1 (delay_e1_s1) and the travel time delay associated with s2 (delay_e1_s2) are calculated using linear interpolation. For example, the travel time delays for element e1 are calculated using the following equations:

$$\text{delay\_e1\_s1} = \text{delay\_e1\_b2} + \tfrac{1}{3} \ast (\text{delay\_e1\_b3} - \text{delay\_e1\_b2}); \text{ and}$$

$$\text{delay\_e1\_s2} = \text{delay\_e1\_b2} + \tfrac{2}{3} \ast (\text{delay\_e1\_b3} - \text{delay\_e1\_b2}).$$

The general delay of e1 for a steering point si (i=1, 2, ..., n) between b1 and b2 using linear interpolation is given as:

$$\text{delay\_e1\_si} = \text{delay\_e1\_b2} + (n-1)/n \ast (\text{delay\_e1\_b3} - \text{delay\_e1\_b2}),$$

where n refers to the number of equally spaced target locations between b2 and b3.

The travel time delay associated with s1 and s2 for the remaining elements are calculated using similar equations. The above equations can be generalized, where e1 can be replaced with any element in a group, and b2 and b3 represent a pair of adjacent locations (each having a corresponding element) surrounding a selected target location.

The result of these calculations is a travel time delay for each element. For a target location s1, the time travel time delays for e2, e3 and e4 are referred to as delay_e2_s1, delay_e3_s1 and delay_e4_s1, respectively. Generalizing for a target location si, the travel time delays for e2, e3 and e4 are referred to as delay_e2_si, delay_e3_si and delay_e4_si, respectively.

Once the travel time delays for a target location are calculated, the beamforming delay can then be calculated. The beam forming delay (also referred to as a beam delay) for an element refers to the delay to be applied to a driver signal in order to direct the beam emitted from a group of elements to a target location.

In this example, to steer the beam to location b2, the beam delay for each of e1, e2, e3, and e4 is calculated as follows. The minimum delay to b2 (min_b2) is calculated:

$$\text{min\_b2} = \min(\text{delay\_e1\_b2}, \text{delay\_e2\_b2}, \text{delay\_e3\_b2}, \text{delay\_e4\_b2}).$$

Then the beam delay for each element is calculated as:

$$\text{beam\_e1\_b2} = \text{delay\_e1\_b2} - \text{min\_b2};$$

$$\text{beam\_e2\_b2} = \text{delay\_e2\_b2} - \text{min\_b2};$$

$$\text{beam\_e3\_b2} = \text{delay\_e3\_b2} - \text{min\_b2}; \text{ and}$$

$$\text{beam\_e4\_b2} = \text{delay\_e4\_b2} - \text{min\_b2}.$$

To steer the beam to target location s1, the beam delay for e1, e2, e3 and e4 is calculated as follows:

$$\min\_s1 = \min(delay\_e1\_s1, delay\_e2\_s1, delay\_e3s1, delay\_e4s1)$$

$$beam\_e1\_s1 = delay\_e1\_s1 - \min\_s1;$$

$$beam\_e2\_s1 = delay\_e2\_s1 - \min\_s1;$$

$$beam\_e3\_s1 = delay\_e3\_s1 - \min\_s1; \text{ and}$$

$$beam\_e4\_s1 = delay\_e4\_s1 - \min\_s1.$$

To steer the beam to target location si, the beam delay for e1, e2, e3 and e4 is calculated as follows:

$$\min\_si = \min(delay\_e1\_si, delay\_e2\_si, delay\_e3\_si, delay\_e4\_si)$$

$$beam\_e1\_si = delay\_e1\_si - \min\_si;$$

$$beam\_e2\_si = delay\_e2\_si - \min\_si;$$

$$beam\_e3\_si = delay\_e3\_si - \min\_si; \text{ and}$$

$$beam\_e4\_si = delay\_e4\_si - \min\_si.$$

The beam delays can be calculated for sequential target locations by repeating the calculation for an adjacent group (e.g., e2, e3, e4 and e5), and continuing through adjacent groups. In addition, groups can be selected for target locations that are identified during a logging operation.

It is noted that the selected transducer elements, groups, number and configuration of elements, and nomenclature is exemplary and not meant to be limiting. The methods described herein apply to any plurality of transducer elements (or separate transmitters and receivers).

By driving the specified transducers with accurate delays, the imaging tool can additionally focus on interesting target locations (e.g., detected fractures) without being limited by the sequential scan per revolution. This flexibility enables the imaging tool to achieve high resolution images for interesting regions. This feature-driven sequence can run in parallel with the normal incremental rotation sequence to maintain the best logging speed. For example, the imaging tool can scan the borehole in a normal sequence to build the regular fracture image, and when features indicated by the change of echoes are detected, a parallel sequencing beam can be activated to send additional scan information to a tool-based memory.

In addition to the regular image created by sequentially scanning the borehole, the feature-driven scan can be invoked on the fly to focus additional steering points to a local region, thereby creating more pixels and details to the interesting region. The regular image and the detail-rich image can be processed into a combined image for display, via re-ordering pixels, adjusting the logging time stamp and depth, aligning edges and texture, re-sampling images, and so on.

The beam forming method can be incorporated in a borehole and/or formation imaging operation in various ways. For example, the normal pulse-echo task used to image the borehole can be held periodically, and the method can be performed to update the beam delays. In another example, beam delays can be updated at the end of one or a plurality of revolutions.

In yet another example, beam delay calculations can be performed concurrently with a normal pulse and echo task using different transducers than those currently operating to generate an image, such as the transducers on the opposite side of the array relative to the transducers currently being operated. For example, when e1, e2, e3, and e4 in a cyclic array with 64 elements are conducting pulse and echo tasks, the elements e33, e34, e35, and e35 can be used to execute the procedure to update the beam delays.

The scan order can zigzag in acquiring the borehole image to reduce the signal interference, which is induced by the reflection of the previously fired pulse. The next firing transducers are selected from those having a larger angle from the current ones, for instance, using a new fire sequence: e1, e33, e2, e34, e3, e35, instead of e1, e2, e3, e4, e33, e34, e35 . . . .

Echo detection in typical acoustic imaging operations can be corrupted by the ring down. The ring down is the combined result of the excitation ringing of piezoelectric transducers, sensor noise, and interference between the element and front window of the assembly. The variations of the individual element, down hole temperature and pressure, and beamforming of elements results in a non-stationary ring down noise, which would interfere with and corrupt the target echo detection, especially at noisy and short standoff conditions. Having the capability to gate the transducer ring down in down hole is highly desirable for robust and accurate echo detection.

The adaptive beam forming method allows for effective gating to reduce or eliminate ring down effects. As discussed above, one transducer is used as the transmitter and the adjacent elements are used as the receivers. These adjacent receivers have little ring down effect and make it easier to detect the echoes. They can be used to determine the detection window to search the echo at the transmitter. Once the detection window is known, the echo detection is trivial.

Figure 10:
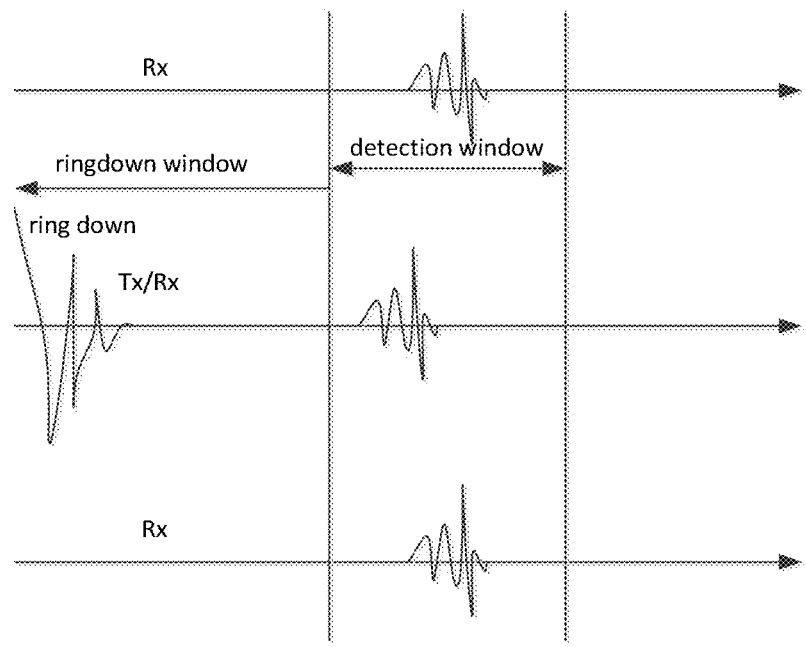
FIG. 10 illustrates exemplary return signals detected by transducers as part of the method of FIG. 5.

In one embodiment, during the echo detection stages of the method, the timing of the ring down detected by the transmitting transducer is detected, and a detection window is selected for detecting echoes by comparing the waveforms detected by the transmitting transducer to the waveform detected by one or more receiving transducers. For example, as shown in FIG. 10, the ring down portion of the waveform associated with the transmitter (Tx/Rx) is evident when compared to waveforms of adjacent receivers (Rx). The detection window is selected to exclude the time during which ring down is prominent (the "ring down window").

The embodiments described herein provide numerous advantages. The disclosure relates to methods of achieving high resolution images for borehole fracture detection. Through adaptive beamforming, the imager can deliver an improved resolution in each revolution not limited to the number of transducers in the tool as well as improved resolution in radial depth of field beyond the limitation posed by the logging speed.

Generally, some of the teachings herein are reduced to an algorithm that is stored on machine-readable media. The algorithm is implemented by a computer or processor such as the processing unit 20 and/or electronics unit 32 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of performing acoustic imaging comprising:
    disposing a carrier in a borehole in an earth formation, the carrier including an acoustic imaging device, the acoustic imaging device including a plurality of acoustic transducers, each transducer of the plurality of acoustic transducers having an associated orientation;
    selecting a target location, and selecting a group of transducers from the plurality of acoustic transducers to transmit an acoustic beam to be electronically directed to the target location;
    selecting a transducer from the group of transducers as a transmitter, the transmitter having an orientation toward a location proximate to the target location, and transmitting an acoustic signal only by the transmitter;
    detecting an acoustic return signal by the transmitter and by a plurality of other transducers in the group;
    estimating a travel time for each of the group of transducers, the travel time corresponding to the amount of time between transmitting the acoustic signal to the location and detecting the acoustic return signal, the estimating including measuring a travel time for each of the other transducers, and estimating a travel time for the transmitter based on the travel time for each of the other transducers;
    calculating a beamforming delay associated with the transmitter and the other transducers based on the travel time, the beamforming delay configured to cause the group of transducers to generate an acoustic beam that is directed to the target location.

2. The method of claim 1, further comprising:
    transmitting an acoustic beam toward the target location by actuating each of the group of transmitters according to the beamforming delay associated with each transducer; and
    receiving reflected signals by one or more of the transducers and generating an image of at least one of the borehole and the earth formation based on the reflected signals.

3. The method of claim 1, wherein the at least one transducer is a pair of adjacent transducers configured as a first transmitter oriented toward a first location and a second transmitter oriented toward a second location.

4. The method of claim 3, wherein estimating includes estimating a first travel time for each of the group of transducers, the first travel time corresponding to the amount of time between transmitting the acoustic signal to the first location and detecting a first acoustic return signal from the first location, the second travel time corresponding to the amount of time between transmitting a second acoustic signal to the second location and detecting a second acoustic return signal from the second location.

5. The method of claim 4, wherein the target location is between the first location and the second location, and calculating the travel time includes performing a linear interpolation of the first travel time and the second travel time.

6. The method of claim 1, wherein calculating the beamforming delay includes identifying the lowest travel time and subtracting the lowest travel time from the travel time for each of the group of transducers.

7. The method of claim 1, wherein detecting the return signal includes selecting a detection window representing a time period during which the return signal arrives at the group of transducers.

8. The method of claim 7, wherein selecting the detection window includes comparing a waveform detected by the transmitter to waveforms detected by the other transducers, and identifying a ring down component of the waveform based on the comparison.

9. The method of claim 1, wherein the plurality of transducers include a transducer array forming at least a semicircular shape, the array configured to emit acoustic signals in a radial direction relative to an axis of the carrier.

10. The method of claim 1, wherein the beamforming delay is calculated during an acoustic imaging operation that includes sequentially scanning at least one of the borehole and the formation to generate an image, the beamforming delay calculated to at least one of:
    update previously configured beamforming delays for the group of transducers; and
    focus the acoustic beam toward a location of interest to generate a higher resolution image of the location of interest relative to the image generated via the scanning.

11. An apparatus for performing acoustic imaging comprising:
    a carrier configured to be disposed in a borehole in an earth formation, the carrier including an acoustic imaging device, the acoustic imaging device including a plurality of acoustic transducers, each transducer of the plurality of acoustic transducers having an associated orientation; and a processor configured to perform:
selecting a target location, and selecting a group of transducers from the plurality of acoustic transducers to transmit an acoustic beam to be electronically directed to the target location;
selecting a transducer from the group of transducers as a transmitter, the transmitter having an orientation toward a location proximate to the target location;
sending a control signal to the transmitter, the control signal causing only the transmitter to transmit acoustic signal;
receiving an acoustic return signal detected by the transmitter and by a plurality of other transducers in the group;
estimating a travel time for each of the group of transducers, the travel time corresponding to the amount of time between transmitting the acoustic signal to the location and detecting the acoustic return signal, the estimating including measuring a travel time for each of the other transducers, and estimating a travel time for the transmitter based on the travel time for each of the other transducers; and
calculating a beamforming delay associated with the transmitter and the other transducers based on the travel time, the beamforming delay configured to cause the group of transducers to generate an acoustic beam that is directed to the target location; and
a delay circuit configured to apply the beamforming delay to a control signal sent by the processor to each of the group of transducers.

12. The apparatus of claim 11, wherein the processor is further configured to perform:
sending a control signal to a driver coupled to each of the group of transducers, the driver configured to actuate a respective transducer according to the control signal and the beamforming delay, the control signal causing the group of transducers to transmit an acoustic beam toward the target location; and
receiving reflected signals detected by one or more of the transducers and generating an image of at least one of the borehole and the earth formation based on the reflected signals.

13. The apparatus of claim 11, wherein the at least one transducer is a pair of adjacent transducers configured as a first transmitter oriented toward a first location and a second transmitter oriented toward a second location.

14. The apparatus of claim 13, wherein estimating includes estimating a first travel time for each of the group of transducers, the first travel time corresponding to the amount of time between transmitting the acoustic signal to the first location and detecting a first acoustic return signal from the first location, the second travel time corresponding to the amount of time between transmitting a second acoustic signal to the second location and detecting a second acoustic return signal from the second location.

15. The apparatus of claim 14, wherein the target location is between the first location and the second location, and estimating the travel time includes performing a linear interpolation of the first travel time and the second travel time.

16. The apparatus of claim 11, wherein calculating the beamforming delay includes identifying the lowest travel time and subtracting the lowest travel time from the travel time for each of the group of transducers.

17. The apparatus of claim 11, wherein detecting the return signal includes selecting a detection window representing a time period during which the return signal arrives at the group of transducers.

18. The apparatus of claim 17, wherein selecting the detection window includes comparing a waveform detected by the transmitter to waveforms detected by the other transducers, and identifying a ring down component of the waveform based on the comparison.

19. The apparatus of claim 11, wherein the plurality of transducers include a transducer array forming at least a semicircular shape, the array configured to emit acoustic signals in a radial direction relative to an axis of the carrier.

20. The apparatus of claim 11, wherein the beamforming delay is calculated during an acoustic imaging operation that includes sequentially scanning at least one of the borehole and the formation to generate an image, the beamforming delay calculated to at least one of:
update previously configured beamforming delays for the group of transducers; and
focus the acoustic beam toward a location of interest to generate a higher resolution image of the location of interest relative to the image generated via the scanning.

\* \* \* \* \*